US012707142B2

(12) United States Patent
Shimada et al.

(10) Patent No.: US 12,707,142 B2
(45) Date of Patent: Aug. 11, 2026

(54) IMAGING CONTROL APPARATUS, IMAGING CONTROL METHOD, AND IMAGING CONTROL PROGRAM

(71) Applicant: FUJIFILM Corporation, Tokyo (JP)

(72) Inventors: Tomoharu Shimada, Saitama (JP); Tetsuro Ashida, Saitama (JP); Morito Niseki, Saitama (JP); Atsushi Onoda, Saitama (JP); Yuta Abe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 10 days.

(21) Appl. No.: 18/588,815

(22) Filed: Feb. 27, 2024

(65) Prior Publication Data

US 2024/0205538 A1 Jun. 20, 2024

Related U.S. Application Data

(63) Continuation of application No. PCT/JP2022/027227, filed on Jul. 11, 2022.

(30) Foreign Application Priority Data

Aug. 31, 2021 (JP) ................................ 2021-142010

(51) Int. Cl.
*H04N 23/66* (2023.01)
*H04N 23/62* (2023.01)
(Continued)

(52) U.S. Cl.
CPC ............. *H04N 23/66* (2023.01); *H04N 23/62* (2023.01); *H04N 23/69* (2023.01); *H04N 23/611* (2023.01)

(58) Field of Classification Search
CPC ...... G03B 17/02; H04N 23/60; H04N 23/611; H04N 23/62; H04N 23/66; H04N 23/69; H04N 23/695
See application file for complete search history.

(56) References Cited

U.S. PATENT DOCUMENTS 8,149,313 B2 * 4/2012 Watanabe ............ H04N 23/611 348/333.12
8,786,749 B2 * 7/2014 Park ....................... H04N 5/772 348/222.1

(Continued)

FOREIGN PATENT DOCUMENTS

JP 2002-158903 A 5/2002
JP 2006203401 A * 8/2006

(Continued)

OTHER PUBLICATIONS

International Search Report issued in PCT/JP2022/027227; mailed Aug. 16, 2022.

(Continued)

*Primary Examiner* — Antoinette T Spinks
(74) *Attorney, Agent, or Firm* — Studebaker Brackett PLLC

(57) ABSTRACT

An imaging control apparatus, that controls plural imaging apparatuses, includes: a processor; and a memory, and the processor is configured to change, based on a first operation different from an operation of changing imaging setting of the plural imaging apparatuses, the imaging setting for at least one of the plural imaging apparatuses.

5 Claims, 4 Drawing Sheets

(51) Int. Cl.
*H04N 23/69* (2023.01)
*H04N 23/611* (2023.01)

(56) References Cited

U.S. PATENT DOCUMENTS

2006/0267770 A1 11/2006 Sanari et al.
2020/0045239 A1* 2/2020 Suzuki ............... G01C 21/3841
2021/0136349 A1 5/2021 Itakura
2023/0298197 A1* 9/2023 Agrawal ................... G06T 7/70 345/174

FOREIGN PATENT DOCUMENTS

JP 2006-318313 A 11/2006
JP 2007-306464 A 11/2007
JP 2012234041 A * 11/2012
JP 2013-090196 A 5/2013
JP 2016163254 A * 9/2016
JP 2020-005089 A 1/2020
JP 2021093694 A * 6/2021
WO 2018/088037 A1 5/2018

OTHER PUBLICATIONS

Written Opinion of the International Searching Authority issued in PCT/JP2022/027227; mailed Aug. 16, 2022.
An Office Action, “Notice of Reasons for Refusal,” mailed by the Japanese Patent Office on Jan. 6, 2026, which corresponds to Japanese Patent Application No. 2023-545130 and is related to U.S. Appl. No. 18/588,815; with English language translation.
An Office Action, “Decision of Refusal”, mailed by the Japanese Patent Office on May 26, 2026, which corresponds to Japanese Patent Application No. 2023-545130 and is related to U.S. Appl. No. 18/588,815; with English language translation.

* cited by examiner

IMAGING CONTROL APPARATUS, IMAGING CONTROL METHOD, AND IMAGING CONTROL PROGRAM

CROSS REFERENCE TO RELATED APPLICATION

This is a continuation of International Application No. PCT/JP2022/027227 filed on Jul. 11, 2022, and claims priority from Japanese Patent Application No. 2021-142010 filed on Aug. 31, 2021, the entire disclosures of which are incorporated herein by reference.

BACKGROUND OF THE INVENTION

1. Field of the Invention

The present invention relates to an imaging control apparatus, an imaging control method, and a computer readable medium storing an imaging control program.

2. Description of the Related Art

WO2018/088037A discloses a control device of a movable type imaging apparatus. The control device comprises an imaging information acquisition unit and a disposition information calculation unit. The imaging information acquisition unit acquires imaging information related to imaging from a plurality of movable imaging apparatuses having an imaging function. The disposition information calculation unit calculates disposition information for disposing the plurality of movable imaging apparatuses in order to generate a free viewpoint video by combining images captured by the plurality of movable imaging apparatuses, based on the imaging information.

JP2007-306464A discloses an imaging control method. Specifically, a plurality of preview images are acquired by performing preview imaging on substantially the same main subject at different angles using a plurality of imaging apparatuses. In addition, a composition evaluation value, which is an indicator of whether a quality of composition is good or bad, is calculated for the plurality of acquired preview images. Further, an imaging apparatus to be used for imaging is determined based on the calculated composition evaluation value, and an imaging instruction is given to the determined imaging apparatus.

JP2013-090196A discloses an imaging apparatus. The imaging apparatus comprises an imaging unit, an imaging direction control unit, and a brightness detection unit. The imaging unit generates image data by imaging a subject. The imaging direction control unit performs a control of changing an imaging direction of the imaging unit. The brightness detection unit analyzes the image data generated by the imaging unit and detects a region having the highest brightness in an image related to the image data. The imaging direction control unit performs a control of changing the imaging direction of the imaging unit such that the region detected by the brightness detection unit is located at a center position of the image.

SUMMARY OF THE INVENTION

An object of the present invention is to flexibly change imaging setting of an imaging apparatus.

According to the technology of the present disclosure, there is provided an imaging control apparatus that controls a plurality of imaging apparatuses, the imaging control apparatus comprising: a processor; and a memory, in which the processor changes, based on a first operation different from an operation of changing imaging setting of the imaging apparatus, the imaging setting for at least one imaging apparatus.

According to the technology of the present disclosure, there is provided an imaging control method of controlling a plurality of imaging apparatuses, the imaging control method comprising: changing, based on a first operation different from an operation of changing imaging setting of the imaging apparatus, the imaging setting for at least one imaging apparatus.

According to the technology of the present disclosure, there is provided a computer readable medium storing an imaging control program for controlling a plurality of imaging apparatuses, the program causing a processor to execute: a step of changing, based on a first operation different from an operation of changing imaging setting of the imaging apparatus, the imaging setting for at least one imaging apparatus.

According to the present invention, it is possible to flexibly change the imaging setting of the imaging apparatus.

DESCRIPTION OF THE PREFERRED EMBODIMENTS

Figure 1:
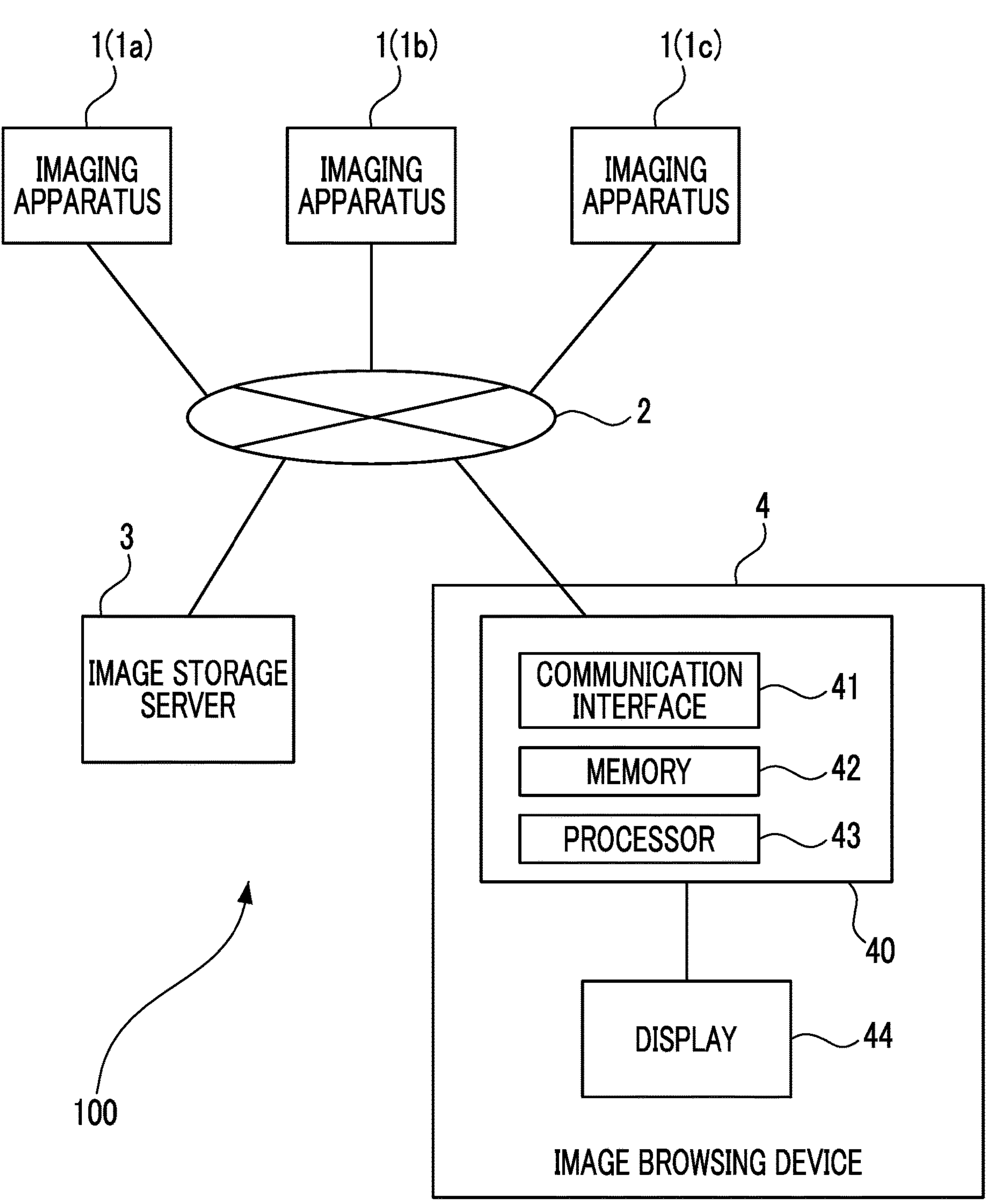
FIG. 1 is a diagram showing a schematic configuration of an imaging system 100 including a control device 40 which is an embodiment of an imaging control apparatus according to an aspect of the present invention.

FIG. 1 is a diagram showing a schematic configuration of an imaging system 100 including a control device 40 which is an embodiment of an imaging control apparatus according to an embodiment of the present invention. The imaging system 100 comprises a plurality of imaging apparatuses 1, a network 2 such as the Internet or a local area network (LAN), an image storage server 3, and an image browsing device 4. In the example of FIG. 1, the imaging apparatus 1 includes an imaging apparatus 1*a*, an imaging apparatus 1*b*, and an imaging apparatus 1*c*. The imaging apparatus 1 is disposed, for example, at an event venue such as a wedding hall or an imaging studio. Three imaging apparatuses 1 are disposed at different positions of the same installation location, and are configured to image a subject at the installation location from different directions.

The imaging apparatus 1 includes an imaging element, an image processing circuit, and a communication interface. The image processing circuit generates image data by processing a captured image signal obtained by imaging the subject using the imaging element. The communication interface can be connected to the network 2. The imaging apparatus 1 is formed of, for example, a digital camera or a smartphone. The image data generated by the imaging apparatus 1 is also described as image data captured by the imaging apparatus 1. A tag of the image data generated by the imaging apparatus 1 includes identification information of the imaging apparatus 1 that has generated the image data. The imaging apparatus 1 transmits the generated image data to the image storage server 3 via the network 2. The imaging apparatus 1 executes the imaging automatically and continuously or at predetermined intervals.

The image storage server 3 comprises a processor, a communication interface, and a storage device. The communication interface can be connected to the network 2. The storage device includes a solid state drive (SSD), a hard disk drive (HDD), or the like. This storage device may be a network storage device connected to the network 2. The processor of the image storage server 3 acquires the image data transmitted from the imaging apparatus 1 and stores the acquired image data in the storage device.

The image browsing device 4 is a device for browsing an image based on the image data stored in the storage device of the image storage server 3. Hereinafter, an image is mainly displayed on a display 44 of the image browsing device 4, and is directly viewed or edited by a user, but for convenience of explanation, explanations such as "display image data", "browse image data", and "edit image data" may be given. Accordingly, "display image data" includes "display image based on image data", "browse image data" includes "browse image based on image data", and "edit image data" includes "edit image based on image data". The displaying, browsing, editing, or the like of the image data may include displaying, browsing, editing, or the like of tag information assigned to the image.

The image browsing device 4 comprises the display 44 and a control device 40. The display 44 is a liquid crystal display panel, an organic electro-luminescence (EL) display panel, or the like. The control device 40 constitutes an imaging control apparatus.

The display 44 is equipped with a touch panel, and the user can perform various operations on a display region with a finger or the like. The display 44 need not be equipped with the touch panel. In this case, it is sufficient to perform an operation on the display 44 by using an operation device such as a mouse connected to the control device 40. As an example of the image browsing device 4, a personal computer, a smartphone, a tablet terminal, or the like is used.

In FIG. 1, although one image browsing device 4 is included in the imaging system 100, a plurality of the image browsing devices 4 may exist. In a case in which one image browsing device 4 is provided, the image browsing device 4 is provided at, for example, an imaging location such as an event venue or an imaging studio. A case in which the plurality of image browsing devices 4 are used corresponds to a case in which a plurality of people who are present at a distance from the imaging location, in addition to the imaging location, browse the image data captured at the imaging location in real time using the image browsing devices 4, respectively.

For example, a scene is assumed in which a user at a remote place who is unable to participate in a wedding ceremony uses the image browsing device 4 to browse the image data captured during the wedding ceremony. In addition, a scene is assumed in which, in a case in which a grandchild is performing imaging, a grandparent who is present at a distance from the studio browses the image data captured at the imaging studio by using the image browsing device 4. The image browsing device 4 may of course be used at the imaging location.

The control device 40 comprises a communication interface 41 for connection to the network 2, a memory 42 including a random access memory (RAM) and a read only memory (ROM), and a processor 43.

The processor 43 is a central processing unit (CPU), a programmable logic device (PLD), a dedicated electric circuit, or the like. The CPU is a general-purpose processor, and performs various functions by executing software (program). The PLD is a processor whose circuit configuration can be changed after manufacture, and is, for example, a field programmable gate array (FPGA). The dedicated electric circuit has a circuit configuration exclusively designed to execute a specific process, and is, for example, an application specific integrated circuit (ASIC).

In addition, the processor 43 may be configured of one processor or may be configured of a combination of two or more processors of the same type or different types. For example, a combination of a plurality of FPGAs or a combination of a CPU and an FPGA may be used. More specifically, the hardware structure of the processor 43 is an electric circuit (circuitry) in which circuit elements, such as semiconductor elements, are combined.

Next, control performed by the processor 43 of the control device 40 will be described. The control performed by the processor 43 mainly includes imaging control and display control. In the imaging control, the processor 43 controls the imaging apparatus 1. In the display control, the processor 43 controls display of the image data stored in the storage device of the image storage server 3 on the display 44.

Display Control

The processor 43 performs control of sequentially acquiring the image data from the image storage server 3 and displaying the acquired image data on the display 44.

Figure 2:
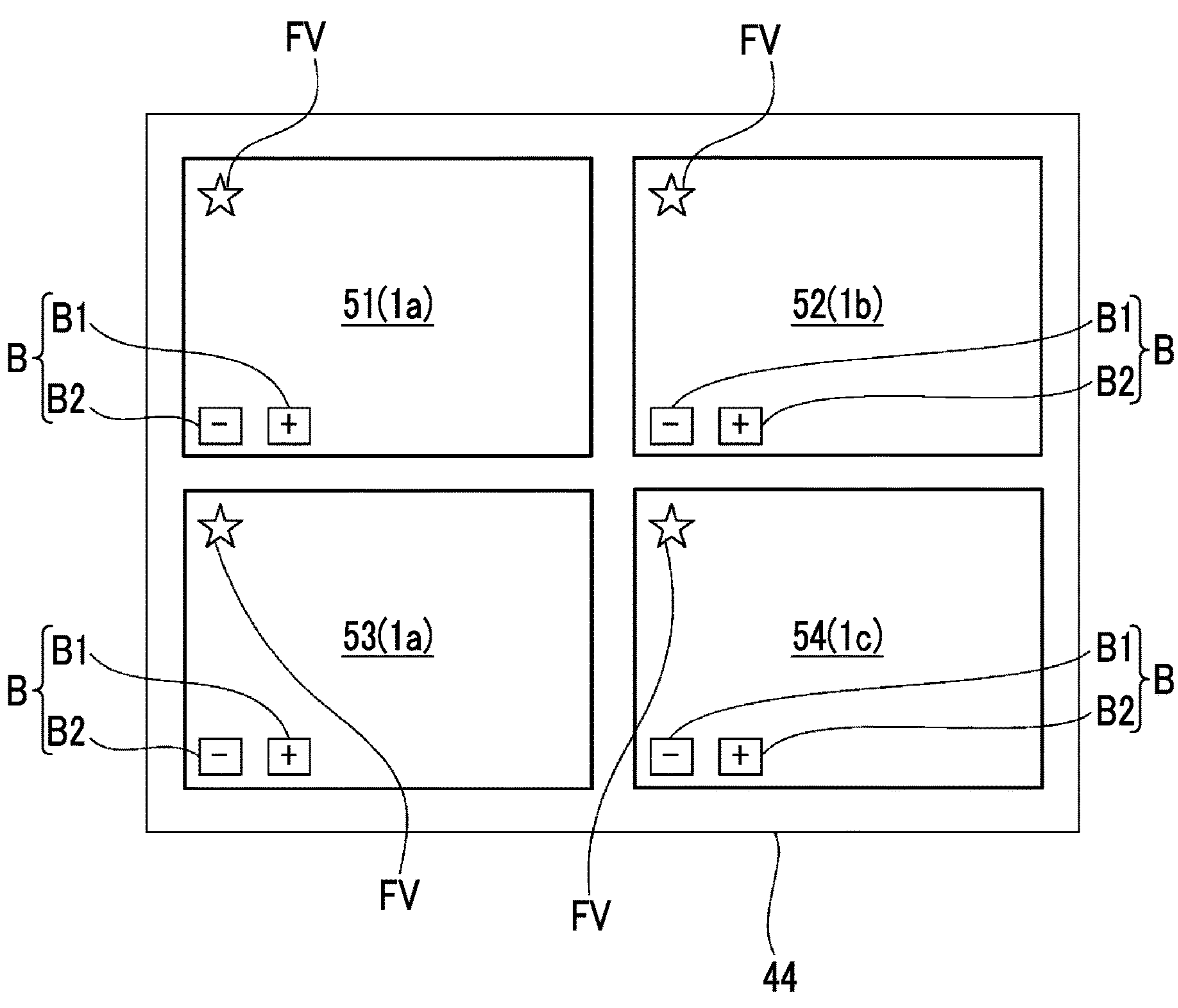
FIG. 2 is a schematic diagram showing a display example of a display 44.

FIG. 2 is a schematic diagram showing a display example of the display 44. In the example of FIG. 2, image data 51, image data 52, image data 53, and image data 54 are displayed on the display 44. The reference numerals in parentheses in FIG. 2 indicate imaging apparatuses from which pieces of image data have been captured. That is, the image data 51 is image data captured by an imaging apparatus 1*a*. The image data 52 is image data captured by an imaging apparatus 1*b*. The image data 53 is image data captured by the imaging apparatus 1*a*. The image data 54 is image data captured by an imaging apparatus 1*c*.

In the example of FIG. 2, a plurality of pieces of the image data captured by a plurality of the imaging apparatuses 1*a*, 1*b*, and 1*c* are displayed on the display 44, but depending on a timing, one image data or a plurality of pieces of image data captured by only one imaging apparatus 1 may be displayed on the display 44.

An image adjustment icon B and a favorite icon FV are superimposed and displayed on each image data displayed on the display 44 in association with each other. Both the image adjustment icon B and the favorite icon FV can be operated by the user.

The image adjustment icon B is used for adjusting or changing an element of the image data. In the example in FIG. 2, the image adjustment icon B is used for inputting an instruction to increase or decrease a brightness as one of the elements of the image data, to the processor 43.

The image adjustment icon B includes a plus icon B1 and a minus icon B2. In a case in which the plus icon B1 is operated by the user, the processor 43 performs editing of increasing the brightness of the image data corresponding to the plus icon B1 by a predetermined amount, and updates the image data to the edited image data. In a case in which the minus icon B2 is operated by the user, the processor 43 performs editing of decreasing the brightness of the image data corresponding to the minus icon B2 by a predetermined amount, and updates the image data to the edited image data.

In the above description, the image adjustment icon B is described as an icon for changing the brightness, which is one of the elements of the image data, but the image adjustment icon B is not limited to this. For example, the image adjustment icon B may be an icon for changing an angle of view, which is one of the changeable elements of the image data. For example, original image data and a settable rectangular cutting range may be set to have the same aspect ratio and center position, and a size (corresponding to the angle of view) of the cutting range may be changed by operating the image adjustment icon B.

In a case in which the image adjustment icon B is operated, the processor 43 cuts out the image data corresponding to the image adjustment icon B in accordance with the operation, and updates the original image data to the image data after the cutout. The operation of the image adjustment icon B can be said to be an operation with respect to the image data corresponding to the image adjustment icon B. The processor 43 may further display an icon for performing an operation of returning to the original image data, on the display 44.

The favorite icon FV is used for the user to register the preferred image data as a favorite. In a case in which an instruction to add a favorite through the operation of the favorite icon FV corresponding to the image data is detected, the processor 43 adds favorite information to, for example, a tag of the image data. Specifically, in a case in which the instruction to add to the favorite is detected, the processor 43 adds the favorite information to the original image data stored in the image storage server 3.

In a case in which the image data to which the favorite information is added is displayed on the display 44, the processor 43 preferably controls to display the image data in a manner distinguishable from the image data to which the favorite information is not added. The operation of the favorite icon FV corresponds to an operation of inputting an evaluation for the image data to the processor 43. The operation of the favorite icon FV can be said to be an operation with respect to the image data corresponding to the favorite icon FV.

The evaluation for the image data is not limited to the operation by the favorite icon. The evaluation for the image data need only indicate that the user has a favorable feeling or sympathy for the image data or to indicate a degree of the user's favorable feeling or sympathy for the image data. Specifically, the evaluation may be an operation of adding "like" to the target image data or an operation of ranking the image data using an indicator such as a star.

Imaging Control

The processor 43 changes imaging setting for at least one of the plurality of imaging apparatuses 1 based on a first operation. The first operation is an operation different from the operation of changing the imaging setting of the imaging apparatus 1. The imaging setting of the imaging apparatus 1 refers to setting of an imaging timing, an imaging frequency, an imaging direction (pan and tilt angles), an exposure (stop, shutter speed, imaging sensitivity, or the like), a zoom magnification (angle of view), and the like. The processor 43 changes at least one setting (setting item) of a plurality of settings (setting items) included in the imaging setting, based on the first operation.

In the present embodiment, among the plurality of imaging apparatuses, the imaging apparatus whose imaging setting is to be automatically changed by the processor 43 based on the first operation corresponds to a specific imaging apparatus.

The change operation refers to an operation of directly instructing the imaging apparatus 1 to change the imaging setting. Specifically, the change operation includes a direct operation of the user with respect to an operation unit for changing the imaging setting, which is provided in the imaging apparatus 1. The operation unit of the imaging apparatus 1 includes an operation icon implemented by software, an operation button or an operation key implemented by hardware, and the like. In addition, the change operation includes a direct operation of the user with respect to an operation unit provided in the image browsing device 4. The imaging setting of the imaging apparatus 1 can also be changed remotely using the operation unit provided in the image browsing device 4. The operation unit of the image browsing device 4 also includes an operation icon implemented by software, an operation button or an operation key implemented by hardware, and the like.

That is, the change operation refers to an operation in which the user intentionally changes the imaging setting of the imaging apparatus 1.

On the other hand, the first operation different from the change operation refers to an operation other than the operation of the operation part. That is, the first operation is an operation in which the user does not intend to change the imaging setting of the imaging apparatus 1. In other words, the first operation is an operation that is not directly related to the change of the imaging setting of the imaging apparatus 1. For example, the first operation is an operation performed via the display. Specifically, the first operation is at least any one of an operation of receiving element adjustment or element change or an operation of receiving an evaluation for the image data by the user, for the image data displayed on the display 44. The first operation may be an operation of selecting any image data from the plurality of pieces of image data displayed on the display 44 under a predetermined condition. The first operation is, for example, an operation of the image adjustment icon B or an operation of the favorite icon FV with respect to the image data as described above.

Hereinafter, an example of changing the imaging setting of the imaging apparatus 1 based on the first operation will be described. In other words, in the following, an example will be described in which the processor 43 automatically changes the imaging setting of the imaging apparatus 1 based on the operation by the user that is not directly related to the imaging setting without directly changing the imaging setting of the imaging apparatus 1 by the user.

First Change Example of Imaging Setting

The processor 43 changes the imaging setting of the imaging apparatus 1 in a case in which the brightness of the image data is changed using the image adjustment icon B. In other words, in a case in which the brightness of the image data is changed from first setting to second setting by the operation of the image adjustment icon B corresponding to the image data, the processor 43 automatically changes the imaging setting of the imaging apparatus 1. The second setting is a new set value that is received via the image adjustment icon B and reflects the user's preference corresponding to the brightness of the image data.

Specifically, in a case in which the reception of the operation of changing the brightness by the image adjustment icon B is detected, the processor 43 changes setting of the exposure of the imaging apparatus 1 that has captured the target image data, based on the content of the operation.

More specifically, the processor 43 changes the setting of the exposure of the imaging apparatus 1 (target imaging apparatus) that has captured the target image data so that a brightness of new image data to be captured in the future is a value based on the second setting by the target imaging apparatus. Hereinafter, among the plurality of imaging apparatuses 1, the imaging apparatus 1 that has captured the image data for which the operation by the image adjustment icon B has been received is referred to as a target imaging apparatus.

The value based on the second setting refers to the same value as the second setting or a value whose difference (absolute value) from the second setting is less than a threshold value. For example, in a case in which the image adjustment icon B corresponding to the image data 52 shown in FIG. 2 is operated, the processor 43 changes the setting of the exposure of the imaging apparatus 1*b*, which is the target imaging apparatus, to setting based on the operation.

The processor 43 may change not only the setting of the exposure of the target imaging apparatus but also the setting of the exposure of at least one imaging apparatus 1 other than the target imaging apparatus, based on the operation of one image adjustment icon B. For example, in a case in which the operation of the image adjustment icon B with respect to one image data is detected, the processor 43 may change not only the setting of the exposure of the target imaging apparatus but also the setting of the exposure of another imaging apparatus that images the same subject as the target imaging apparatus.

Second Change Example of Imaging Setting

The processor 43 changes the imaging setting of the imaging apparatus 1 in a case in which the angle of view (cutout range) of the image data is changed using the image adjustment icon B. In other words, in a case in which the angle of view (cutout range) of the image data is changed from first setting to second setting by the operation of the image adjustment icon B, the processor 43 automatically changes the imaging setting of the target imaging apparatus. Even in this case, the second setting is a new set value that is received via the image adjustment icon B and reflects the user's preference corresponding to the angle of view of the image data.

Specifically, in a case in which the reception of the operation of changing the angle of view by the image adjustment icon B is detected, the processor 43 changes setting of the angle of view of the target imaging apparatus, based on the content of the operation.

More specifically, in a case in which the angle of view (cutout range) of the image data is changed from the first setting to the second setting by the operation of the image adjustment icon B corresponding to the image data, the processor 43 changes the setting of the imaging apparatus 1 so that an angle of view of image data to be captured by the imaging apparatus 1 that has captured the image data is an angle of view based on the second setting. In other words, the processor 43 changes the setting of the angle of view of the target imaging apparatus so that an angle of view of new image data to be captured in the future is an angle of view based on the second setting by the target imaging apparatus.

Even in this case, the value based on the second setting refers to the same value as the second setting or a value whose difference (absolute value) from the second setting is less than a threshold value. For example, in a case in which the image adjustment icon B corresponding to the image data 52 shown in FIG. 2 is operated, the processor 43 changes the setting of the angle of view of the imaging apparatus 1*b*, which is the target imaging apparatus, to setting according to the operation of the image adjustment icon B.

The angle of view of the imaging apparatus 1 is changed by changing a zoom magnification or by changing an effective range used for recording the image data with respect to a light-receivable range of the imaging element. For example, in a case in which an operation of narrowing the angle of view is performed, the processor 43 controls the angle of view of the imaging apparatus 1 to be narrowed. The processor 43 may change the setting of the angle of view of not only the imaging apparatus 1 that has captured the image data having the changed angle of view but also at least one imaging apparatus 1 other than the imaging apparatus 1, based on the operation of the image adjustment icon B. In other words, the processor 43 may change not only the angle of view of the target imaging apparatus but also the angle of view of another imaging apparatus that images the same subject as the target imaging apparatus, based on the operation of the image adjustment icon B.

According to the first change example and the second change example, in a case in which the user changes the brightness and angle of view of the image data to the preference state, the imaging setting of the imaging apparatus 1 can be changed to the content for obtaining the preference state. In other words, the imaging setting of the target imaging apparatus is automatically changed with respect to already obtained image data, according to information related to the preference of the brightness or angle of view input by the user. As a result, an image (new image data) to be obtained in the future by the target imaging apparatus can be made closer to an image (image data) close to the user's preference.

In this way, since the imaging setting of the imaging apparatus 1 is automatically changed only by performing the editing operation of the image data, the user can realize the intended imaging setting without intending to change the imaging setting. As a result, a highly convenient imaging system can be realized. With the imaging system 100, the user can obtain the imaging setting according to the user's desire without needing knowledge regarding the imaging setting of the imaging apparatus 1. Therefore, even in a case in which the imaging apparatus 1 is highly functional, the service can be provided to many users without selecting the user. In other words, even a user who is not able to efficiently use a highly functional imaging apparatus can utilize the function of the imaging apparatus 1 according to the present embodiment, to adjust the imaging setting to the preferred brightness or angle of view and image the subject.

Third Change Example of Imaging Setting

The processor 43 changes the imaging setting of the imaging apparatus 1 based on the operation of the favorite icon FV by the user. Specifically, the processor 43 changes, based on the operation of the favorite icon FV by the user, the imaging setting of the imaging apparatus 1 other than the target imaging apparatus related to the operation.

In a case in which the favorite information is added to the image data by the operation of the favorite icon FV corresponding to the image data, the processor 43 performs, based on the imaging setting of the imaging apparatus 1 that has captured the image data, the imaging setting of the imaging apparatus 1 other than the imaging apparatus 1 that has captured the image data. Here, "a case in which the favorite information is added to the image data" corresponds to "a case in which an evaluation equal to or greater than a first threshold value is added". In addition, the imaging apparatus that has captured the image data for which the operation of the favorite icon FV has been received is also referred to as a target imaging apparatus. In a case in which the reception of the operation of the favorite icon FV is detected, the processor 43 changes, based on the operation, the imaging setting of the imaging apparatus 1 other than the target imaging apparatus to match the imaging setting set in the target imaging apparatus. In the following, the image data to which the favorite information is added is referred to as favorite image data.

For example, in a case in which the favorite information is added to the image data 51 shown in FIG. 2, the processor 43 changes at least a part of the imaging setting of each of the imaging apparatus 1*b* and the imaging apparatus 1*c* to the same setting as that of the imaging apparatus 1*a* or to setting close to that of the imaging apparatus 1*a*. For example, the processor 43 controls the exposure setting or the angle-of-view setting of each of the imaging apparatus 1*b* and the imaging apparatus 1*c* to be the same as or close to the state of the imaging apparatus 1*a*. Here, the close setting or the close state is a value whose difference (absolute value) from a set value of a reference imaging apparatus (target imaging apparatus) is less than a threshold value.

Fourth Change Example of Imaging Setting

The processor 43 changes the imaging setting of the imaging apparatus 1 based on the number of pieces of the favorite image data. Specifically, in a case in which the number of pieces of the favorite image data included in an image data group is equal to or greater than a predetermined number (second threshold value), the processor 43 changes the imaging setting of the imaging apparatus 1 other than the imaging apparatus (target imaging apparatus) related to the pieces of favorite image data. In other words, in a case in which there is an imaging apparatus 1 that has captured pieces of the image data, to which the favorite information is added, whose number is equal to or greater than the second threshold value, the processor 43 performs, based on the imaging setting of the imaging apparatus 1, the imaging setting of the imaging apparatus 1 other than the imaging apparatus 1 that has captured the image data. For example, a case is assumed in which the image data group captured by the imaging apparatus 1*c* includes pieces of the image data, to which the favorite information is added, whose number is equal to or greater than the second threshold value. In this case, the processor 43 sets at least a part of the imaging setting of each of the imaging apparatus 1*a* and the imaging apparatus 1*b* to the same setting as that of the imaging apparatus 1*c* or to setting close to that of the imaging apparatus 1*c*. For example, the processor 43 controls the exposure setting or the angle-of-view setting of each of the imaging apparatus 1*a* and the imaging apparatus 1*b* to be the same as or close to the state of the imaging apparatus 1*c*. Even in this case, the close setting or the close state is a value whose difference (absolute value) from a set value of the target imaging apparatus is less than a threshold value.

According to the third change example and the fourth change example, the processor 43 changes the imaging setting of the imaging apparatus 1 other than the target imaging apparatus related to the operation in a case in which the user operates the favorite icon FV. As a result, the imaging setting of another imaging apparatus 1 can be made closer to the imaging setting of the imaging apparatus 1 that has captured the user's preferred image data. That is, it is possible to perform imaging that reflects the user's preference without involving a direct operation of changing the imaging setting by the user, with respect to the plurality of imaging apparatuses 1 included in the imaging system 100. In other words, since the imaging setting of the imaging apparatus 1 other than the target imaging apparatus is automatically changed only by the user viewing the image data and operating the favorite icon FV, the user can realize the intended imaging setting without intending to change the imaging setting. Thereby, a highly convenient imaging system can be realized.

Fifth Change Example of Imaging Setting

The processor 43 changes the imaging setting of the imaging apparatus 1 even in a case in which the user operates the favorite icon FV less frequently. Specifically, in a case in which the total number of pieces of the favorite image data included in the image data group is equal to or less than a predetermined number (third threshold value), the processor 43 changes the imaging setting of the imaging apparatus. In other words, the processor 43 determines whether or not the total number of times of operation of the favorite icon FV with respect to the image data included in one image data group is equal to or less than the third threshold value, and changes the imaging setting based on a determination result.

In a case in which there is an image data group in which the number of pieces of image data to which the favorite information is added is equal to or less than the third threshold value among the captured image data groups, the processor 43 changes the imaging setting of the imaging apparatus 1 that has captured the image data of the image data group.

The processor 43 performs this process each time a predetermined time elapses. In other words, the processor 43 compares the number of pieces of the favorite image data included in the image data group corresponding to each of the plurality of imaging apparatuses 1 with the third threshold value, each time the predetermined time elapses. As a result of the comparison, in a case in which there is an image data group in which the number of pieces of favorite image data is equal to or less than the third threshold value among a plurality of the image data groups, the processor 43 changes the imaging setting of the imaging apparatus that has captured the image data of the image data group.

For example, in a case in which the image data group captured by the imaging apparatus 1*c* includes only the number of pieces of the image data to which the favorite information is added that is equal to or less than the third threshold value, the processor 43 changes at least a part of the imaging setting of the imaging apparatus 1*c* to predetermined setting. For example, the processor 43 increases or decreases the set value of the exposure of the imaging apparatus 1*c* such that the set value matches a predetermined set value or approaches a predetermined set value.

According to the fifth change example, the imaging setting of the imaging apparatus 1 that images the image data with less evaluation from the user can be automatically changed. Thereby, it is possible to prevent the image data assumed not to be the user's preference from being continuously captured and to perform imaging optimized for the user.

Sixth Change Example of Imaging Setting

The processor 43 changes the imaging setting of the imaging apparatus 1 in a case in which the favorite icon FV is not operated for a predetermined time. Specifically, the processor 43 determines whether or not the reception of the operation of the favorite icon FV is detected for any image data during a predetermined time. The predetermined time may be, for example, a predetermined time interval after the image browsing device 4 is powered on or a predetermined time after the image data is transmitted to the image browsing device 4 from the imaging apparatus 1.

In a case in which the favorite icon FV is not operated for any image data for a predetermined time, the processor 43 gives a notification to an administrator of the installation location of the imaging apparatus 1 by using a speaker (not shown), the display 44, or the like. Alternatively, in a case in which the favorite icon FV is not operated for a predetermined time, the processor 43 changes a part or all of the imaging setting items of each of the plurality of imaging apparatuses 1. The changed value may be a predetermined value or may be designed to increase or decrease by a predetermined width from the set value at that time.

According to the sixth change example, in a case in which it is determined that the user does not like the image data being captured so much, the imaging setting of the imaging apparatus 1 can be changed. Thereby, it is possible to prevent the image data assumed not to be the user's preference from being continuously captured and to perform imaging optimized for the user.

Seventh Change Example of Imaging Setting

The processor 43 changes the imaging setting of the imaging apparatus 1 based on the image data having one brightness selected by the user from the plurality of pieces of image data having different brightnesses with respect to one image data.

Specifically, in a case in which the image data displayed on the display 44 is selected by the user, the processor 43 generates a plurality of pieces of image data by changing the brightness of the image data by a first width, and displays the plurality of pieces of image data on the display 44.

More specifically, the processor 43 detects the reception of the selection by the user for the image data displayed on the display 44. The processor 43 duplicates the selected image data and changes the set value of the brightness by a predetermined value $\alpha$ (first width) such that the respective pieces of image data have different brightnesses in a stepwise manner. The processor 43 displays the plurality of pieces of image data having different brightness settings on the display 44.

Figure 3:
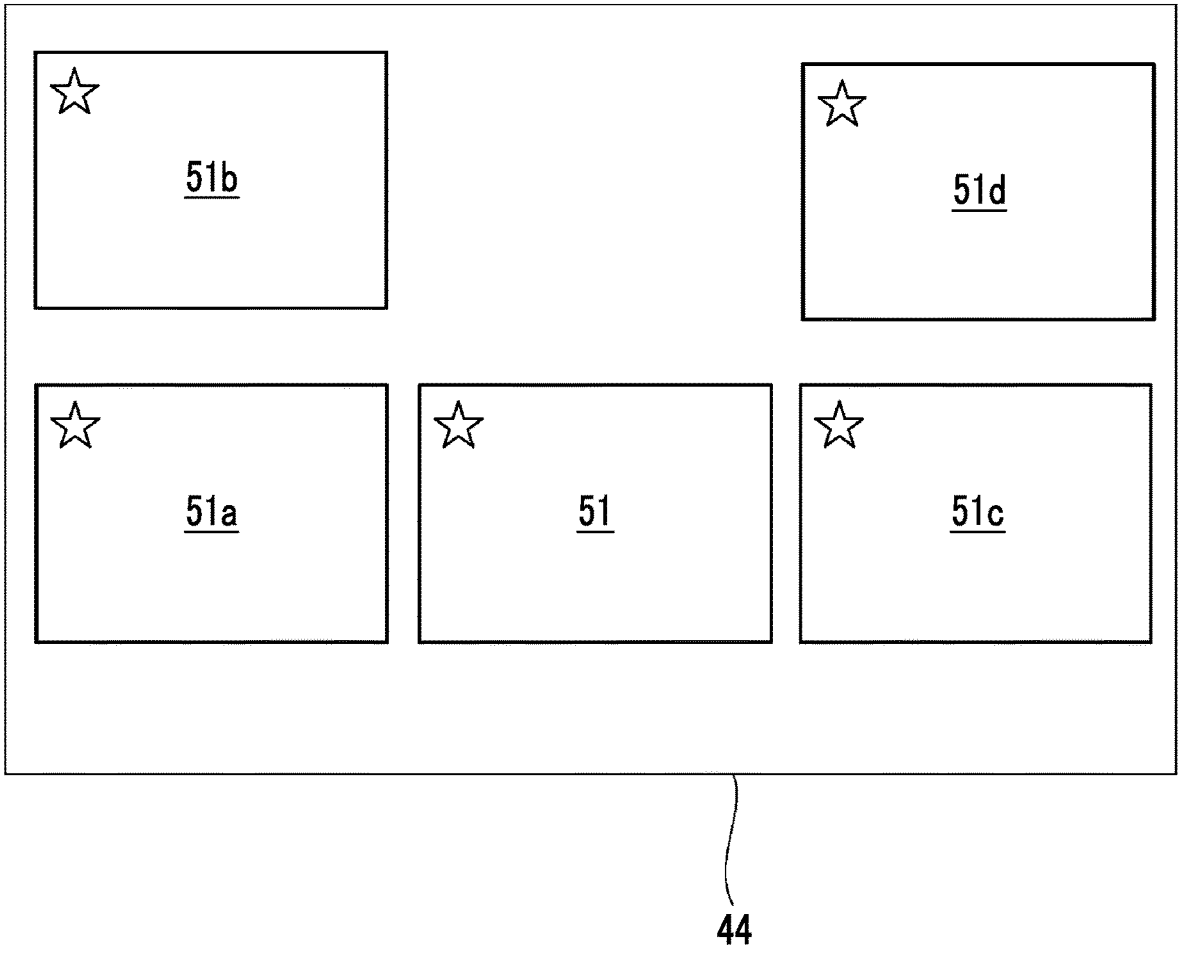
FIG. 3 is a schematic diagram showing an example of a screen that transitions in a case in which image data 51 is selected from a display screen of the display 44 shown in FIG. 2.

FIG. 3 is a schematic diagram showing an example of a screen that transitions in a case in which the image data 51 is selected from a display screen of the display 44 shown in FIG. 2. In the example in FIG. 3, image data 51*a*, image data 51*b*, image data 51*c*, and image data 51*d*, which are obtained by changing the brightness of the image data 51 by the first width, are displayed together with the image data 51.

The image data 51*a* is image data that has a brightness lower than the brightness of the image data 51 by "$\alpha$". The image data 51*b* is image data that has a brightness lower than the brightness of the image data 51*a* by "$\alpha$". The image data 51*c* is image data that has a brightness higher than the brightness of the image data 51 by "$\alpha$". The image data 51*d* is image data that has a brightness higher than the brightness of the image data 51*c* by "$\alpha$". The notation "$\alpha$" corresponds to the first width.

In a case in which the operation of the favorite icon FV is performed on any of the image data 51*a*, the image data 51*b*, the image data 51*c*, or the image data 51*d* in a state where the screen shown in FIG. 3 is displayed, the processor 43 changes the exposure setting of the imaging apparatus 1*a* that has captured the image data 51 to the setting based on the brightness of the image data on which the operation of the favorite icon FV has been performed.

The processor 43 may further perform brightness adjustment on the image data on which the brightness adjustment has been performed. Specifically, the processor 43 may further change the set value of the brightness by a value (second width) smaller than the first width for the image data in which the set value of the brightness has been changed by the first width.

Specifically, in a case in which the operation of the favorite icon FV is performed on any of the image data 51*a*, the image data 51*b*, the image data 51*c*, or the image data 51*d* in a state where the screen shown in FIG. 3 is displayed, the processor 43 changes the brightness of any of the pieces of image data by the second width smaller than the first width to generate a plurality of pieces of image data, and displays the plurality of pieces of image data on the display 44.

Figure 4:
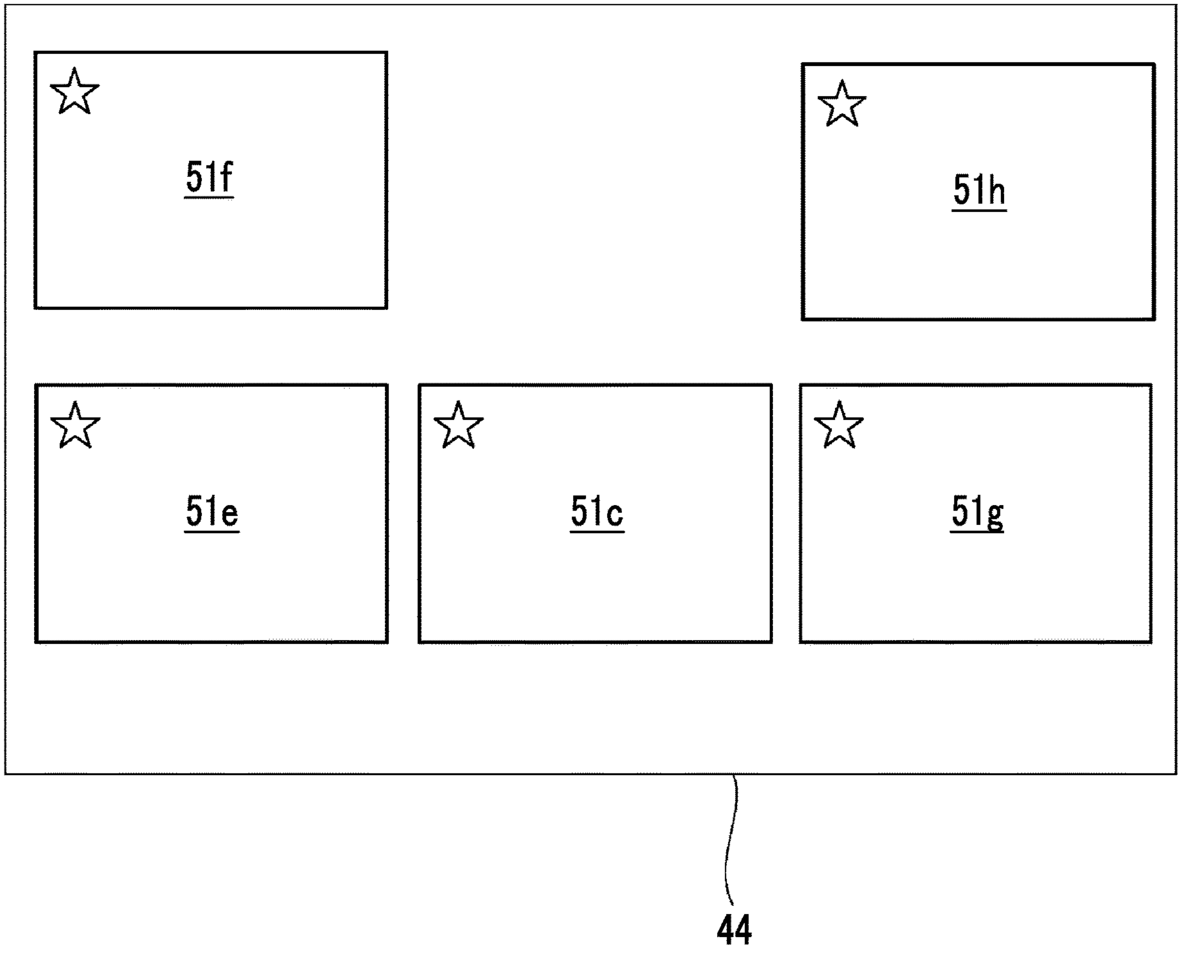
FIG. 4 is a schematic diagram showing an example of a screen that transitions in a case in which a favorite icon FV corresponding to image data 51*c* is operated on a display screen of the display 44 shown in FIG. 3.

FIG. 4 is a schematic diagram showing an example of a screen that transitions in a case in which the favorite icon FV corresponding to the image data 51*c* is operated on the display screen of the display 44 shown in FIG. 3. In the example in FIG. 4, image data 51*e*, image data 51*f*, image data 51*g*, and image data 51*h*, which are obtained by changing the brightness of the image data 51*c* by the second width, are displayed together with the image data 51*c*.

The image data 51*e* is image data that has a brightness lower than the brightness of the image data 51*c* by "$\alpha/3$". The image data 51*f* is image data that has a brightness lower than the brightness of the image data 51*e* by "$\alpha/3$". The image data 51*g* is image data that has a brightness higher than the brightness of the image data 51*c* by "$\alpha/3$". The image data 51*h* is image data that has a brightness higher than the brightness of the image data 51*g* by "$\alpha/3$". The notation "$\alpha/3$" corresponds to the second width.

In a case in which the operation of the favorite icon FV is performed on any of the image data 51*a*, the image data 51*b*, the image data 51*c*, or the image data 51*d* in a state where the screen shown in FIG. 4 is displayed, the processor 43 changes the exposure setting of the imaging apparatus 1*a* that has captured the image data 51 to the setting based on the brightness of the image data on which the operation of the favorite icon FV has been performed.

According to the seventh change example, the display 44 can display a plurality of pieces of image data having different brightnesses with respect to the same image data. Thereby, many options can be provided to the user, and the user can easily find the favorite image data.

In the seventh change example, the processor 43 generates a plurality of pieces of image data having different brightnesses with respect to the image data 51 selected by the user by image processing and displays the plurality of pieces of image data on the display 44. As the change example, sequential imaging may be performed by changing the imaging setting of the imaging apparatus 1*a* that has captured the image data 51 selected by the user by a predetermined change width, and image data obtained by the imaging may be acquired by the processor 43 and displayed on the display 44. That is, the plurality of pieces of image data having different brightnesses may be obtained by the change of the imaging setting of the imaging apparatus 1 instead of the image processing.

A specific example will be described with reference to FIG. 3. The processor 43 changes the exposure setting of the imaging apparatus 1*a* such that the brightness of the image data captured by the imaging apparatus 1*a* is "−α" from the setting at the current point in time, and causes the imaging apparatus 1*a* to execute the imaging. Here, the setting at the current point in time means the exposure setting (reference setting) of the imaging apparatus 1*a* in a case in which the image data 51 is captured. Then, the image data 51*a* obtained by this imaging is displayed on the display 44.

Next, the processor 43 further changes the exposure setting of the imaging apparatus 1*a* such that the brightness of the image data captured by the imaging apparatus 1*a* is "−α" from the current point in time, and causes the imaging apparatus 1*a* to execute the imaging. That is, the processor 43 changes the exposure setting by −2α as compared with the reference setting, and causes the imaging apparatus 1*a* to execute the imaging. Then, the image data 51*b* obtained by this imaging is displayed on the display 44.

Next, the processor 43 further changes the exposure setting of the imaging apparatus 1*a* such that the brightness of the image data captured by the imaging apparatus 1*a* is "+3α" from the current point in time, and causes the imaging apparatus 1*a* to execute the imaging. That is, the processor 43 changes the exposure setting by +α as compared with the reference setting, and causes the imaging apparatus 1*a* to execute the imaging. Then, the image data 51*c* obtained by this imaging is displayed on the display 44.

Next, the processor 43 further changes the exposure setting of the imaging apparatus 1*a* such that the brightness of the image data captured by the imaging apparatus 1*a* is "+α" from the current point in time, and causes the imaging apparatus 1*a* to execute the imaging. That is, the processor 43 changes the exposure setting by +2α as compared with the reference setting, and causes the imaging apparatus 1*a* to execute the imaging. Then, the image data 51*d* obtained by this imaging is displayed on the display 44.

In a case in which the operation of the favorite icon FV is performed on any of the image data 51*a*, the image data 51*b*, the image data 51*c*, or the image data 51*d*, the processor 43 changes the exposure setting of the imaging apparatus 1*a* that has captured the image data 51 to the exposure setting in a case in which any of the pieces of image data is captured. By doing so, it is possible to obtain a difference in the image data that cannot be obtained by the image processing, and it is possible to provide the user with various options.

Further, the processor 43 may selectively perform a first process of generating and displaying a plurality of pieces of image data having different brightnesses by the image processing from the selected image data, and a second process of generating and displaying a plurality of pieces of image data of different brightnesses by the change of the imaging setting for the selected image data. For example, the processor 43 performs the first process in a case in which the network 2 is congested and it takes time to display all the pieces of image data in a case of performing the second process. The processor 43 performs the second process in a case in which the process load is high and it takes time to display all the pieces of image data in a case of performing the first process. By doing so, it is possible to perform an optimum process in accordance with the situation.

In addition to the change of the imaging setting based on the first operation described above, the processor 43 may change the imaging setting based on the subject imaged by the imaging apparatus 1. For example, in a case in which a preset subject is imaged by at least one of the plurality of imaging apparatuses 1, the processor 43 changes the imaging setting (for example, an imaging direction) of an imaging apparatus 1 that does not image the subject to setting for imaging the subject.

Specifically, any subject is registered in advance. In a case where it is recognized that any subject has been imaged by one of the plurality of imaging apparatuses, the processor 43 changes the imaging setting of the other imaging apparatuses such that the subject is imaged by all the imaging apparatuses. As a method of recognizing that any subject has been imaged by one imaging apparatus, image recognition processing may be used, or a transmitter attached to any subject may be used.

For example, a case in which "bride and groom" are registered in advance as any subject will be described as an example. In addition, a situation is assumed in which the bride and groom are imaged by the imaging apparatus 1*a* at a wedding hall, but the bride and groom are not imaged by the imaging apparatuses 1*b* and 1*c*. In such a situation, the imaging directions of the imaging apparatus 1*b* and the imaging apparatus 1*c* are changed to a direction in which the bride and groom fit into the angle of view. That is, based on the image recognition by the image data of the bride and groom registered in advance, or according to the location of the transmitter attached to the bride and groom, the imaging directions of the imaging apparatus 1*b* and the imaging apparatus 1*c* are changed such that the bride and groom fit into the angle of view.

Thereby, a situation in which the main character is imaged can be obtained with any imaging apparatus 1, and a large amount of high-value image data can be generated.

In addition, in a case in which a preset subject is imaged by at least one of the plurality of imaging apparatuses 1, the processor 43 may change the imaging setting (for example, an imaging interval) of an imaging apparatus 1 that has imaged the subject.

For example, a case is assumed in which, at the wedding hall, a state where the bride and groom are not imaged by the imaging apparatus 1*a* is changed to a state where the bride and groom are imaged by the imaging apparatus 1*a*. In this case, the processor 43 sets the imaging interval of the imaging apparatus 1*a* to be shorter than before. Thereby, a large amount of image data can be obtained in a case in which the bride and groom are captured, and a large amount of high-value image data can be generated. In addition, in a state where the bride and groom are not imaged by the imaging apparatus 1*a*, the load on the imaging apparatus 1*a* or the processor 43 can be reduced.

In the description so far, the first operation is an operation with respect to the image data displayed on the display 44, but the first operation is not limited to this.

For example, the first operation may be an operation of causing a factor that affects the subject imaged by the imaging apparatus 1. Examples of the factor that affects the subject include sound, heat, vibration, wind, or an electromagnetic wave (light or the like).

For example, the imaging system 100 is further provided with an output device installed at the installation location of the imaging apparatus 1. The output device is configured to be connectable to the network 2 and is controlled by the processor 43. The output device is, for example, a speaker, a heater, a vibrator, a blower device, or an illumination device.

The output device is disposed, for example, in front of a person to be a model and near the imaging apparatus 1 that images the model at an imaging studio. Therefore, in a case in which the model is a child, it can be expected that a face of the child is directed to the imaging apparatus 1 near the output device by the output device performing the output. In such a case, the processor 43 increases an imaging frequency of the imaging apparatus 1 based on the output of the output device. Thereby, it is possible to capture a large number of photos of the child at a timing at which the face of the child is directed to the imaging apparatus 1.

The processor 43 displays an instruction icon on the display 44. The instruction icon is an icon for inputting an instruction to cause the output device to perform output. In a case in which an operation of the instruction icon by the user is detected, the processor 43 instructs the output device to perform the output. In a case in which the output device performs the output in accordance with the instruction, the processor 43 makes the imaging interval of the imaging apparatus 1 disposed near the output device shorter than before, or causes the imaging apparatus 1 to start imaging immediately. By doing so, it is possible to acquire the image data of the subject intended by the user at an intended timing.

The output device may be a smartphone. In a case in which the output device is a smartphone, an operation of transmitting an e-mail or the like to the smartphone is referred to as the first operation. As described above, the smartphone is disposed near the imaging apparatus 1. Therefore, in a case in which the e-mail is transmitted to the smartphone, the subject approaches the imaging apparatus 1. The processor 43 may detect the first operation to shorten the imaging interval of the imaging apparatus 1 that images a person who is present near the smartphone or to cause the imaging apparatus 1 to immediately start the imaging. The imaging apparatus 1 performs automatic imaging at, for example, a set imaging interval, but immediately executing imaging with the detection of the first operation as a trigger corresponds to temporarily changing the imaging interval, that is, changing the imaging setting.

In addition to the above, the first operation may be an action of moving an object in an imaging region imaged by at least any of the plurality of imaging apparatuses 1 or an action of moving the object from outside the imaging region into the imaging region.

For example, an action in which a person outside the imaging region at an imaging studio throws a ball into the imaging region is the first operation. In a case in which it is detected that the moving ball is included in the image data captured by any of the plurality of imaging apparatuses 1, the processor 43 determines that the first operation has been performed, and changes the imaging setting of at least any of the plurality of imaging apparatuses 1.

In addition, in a case in which it is detected that the ball disappears from the image data captured by any of the plurality of imaging apparatuses 1, the processor 43 determines that the first operation has been performed, and changes the imaging setting of at least any of the plurality of imaging apparatuses 1.

In this way, the imaging setting of the imaging apparatus 1 may be changed by a specific action (action of pressing a switch or the like) of a person inside or outside the imaging region. The action of throwing an object or the action of making an object disappear is not limited to a case in which the person directly performs the action. For example, an object may be thrown by a machine. In such a case, a case in which a switch or the like for throwing an object is mechanically pressed may be determined to be the first operation. The appearance or movement of the ball in the image data may be detected by the processor 43 through image recognition processing based on the image data registered in advance, for example, in addition to detection of an action by a physical device such as a switch by the processor 43.

In addition to the favorite icon FV, a print icon for giving a print instruction or a save icon for giving an instruction of saving to an external device may be further displayed on the display 44 for the image data. In this case, in a case in which the print icon is operated, the processor 43 executes the print processing of the image data and adds the favorite information to the image data. In addition, in a case in which the save icon is operated, the processor 43 executes the save processing of the image data and adds the favorite information to the image data. As described above, printing or saving of the image data can be handled in the same manner as the operation of the favorite icon FV. That is, the operation of printing or saving the image data may be designed to be handled as the first operation.

As described above, at least the following matters are described in the present specification.

(1)

An imaging control apparatus that controls a plurality of imaging apparatuses, the imaging control apparatus comprising: a processor; and a memory, in which the processor changes, based on a first operation different from an operation of changing imaging setting of the imaging apparatus, the imaging setting for at least one imaging apparatus.

(2)

The imaging control apparatus according to (1), in which the first operation is an operation performed via a display that displays image data captured by any of the plurality of imaging apparatuses.

(3)

The imaging control apparatus according to (2), in which the first operation is an operation with respect to the image data displayed on the display.

(4)

The imaging control apparatus according to (3), in which the first operation is an operation of changing a first element of the image data from first setting to second setting, and the processor changes the imaging setting of a specific imaging apparatus, which is an imaging apparatus that has captured the image data having the first element changed by the first operation, so that the first element of the image data captured by the specific imaging apparatus has setting based on the second setting.

(5)

The imaging control apparatus according to (3), in which the first operation is an operation related to an evaluation for the image data, and the processor performs, based on the imaging setting of an imaging apparatus that has captured the image data with the evaluation equal to or greater than a first threshold value, the imaging setting of the imaging apparatus other than the imaging apparatus that has captured the image data.

(6)

The imaging control apparatus according to (3), in which the first operation is an operation related to an evaluation for the image data, and in a case in which the number of pieces of the image data with the evaluation equal to or greater than a first threshold value is equal to or greater than a second threshold value, the processor performs, based on the imaging setting of an imaging apparatus that has captured pieces of the image data with the evaluation whose number is equal to or greater than the second threshold value, the imaging setting of the imaging apparatus other than the imaging apparatus that has captured the image data.

(7)

The imaging control apparatus according to (3), in which the first operation is an operation related to an evaluation for the image data, and the processor changes the imaging setting of an imaging apparatus that has captured an image data group in which a total number of times the first operation is performed is equal to or less than a third threshold value.

(8)

The imaging control apparatus according to (3), in which the processor causes any of the plurality of imaging apparatuses to capture a plurality of pieces of the image data, with the imaging setting changed by a predetermined change width, and changes the imaging setting of the at least one imaging apparatus based on the first operation with respect to the plurality of pieces of image data.

(9)

The imaging control apparatus according to (3), in which the processor changes an element of the image data displayed on the display by a predetermined change width to display a plurality of pieces of the image data, and changes the imaging setting of the at least one imaging apparatus based on the first operation with respect to the plurality of pieces of image data.

(10)

The imaging control apparatus according to (8) or (9), in which the processor changes the change width from a first width to a second width narrower than the first width based on the first operation with respect to the plurality of pieces of image data.

(11)

The imaging control apparatus according to (3), in which, in a case in which a preset subject is imaged by at least one of the plurality of imaging apparatuses, the processor changes the imaging setting of an imaging apparatus that does not image the subject to setting for imaging the subject.

(12)

The imaging control apparatus according to (3), in which, in a case in which a preset subject is imaged by at least one of the plurality of imaging apparatuses, the processor changes the imaging setting of the imaging apparatus that images the subject.

(13)

The imaging control apparatus according to (3), in which the processor changes angles of view of the plurality of imaging apparatuses from a first angle of view to a second angle of view narrower than the first angle of view based on the first operation.

(14)

The imaging control apparatus according to (3), in which the first operation is an operation related to an evaluation for the image data, and the processor gives a notification or changes the imaging setting of the at least one imaging apparatus, in a case in which the first operation is not performed for a predetermined time.

(15)

The imaging control apparatus according to (1) or (2), in which the first operation is an operation of causing a factor that affects a subject to be imaged by any of the plurality of imaging apparatuses.

(16)

The imaging control apparatus according to (15), in which the factor that affects the subject is sound, heat, vibration, wind, or an electromagnetic wave.

(17)

The imaging control apparatus according to (15), in which the first operation is an action of moving an object in an imaging region imaged by at least any of the plurality of imaging apparatuses or an action of moving the object from outside the imaging region into the imaging region.

(18)

An imaging control method of controlling a plurality of imaging apparatuses, the imaging control method comprising: changing, based on a first operation different from an operation of changing imaging setting of the imaging apparatus, the imaging setting for at least one imaging apparatus.

(19)

The imaging control method according to (18), in which the first operation is an operation performed via a display that displays image data captured by any of the plurality of imaging apparatuses.

(20)

The imaging control method according to (19), in which the first operation is an operation with respect to the image data displayed on the display.

(21)

The imaging control method according to (20), in which the first operation is an operation of changing a first element of the image data from first setting to second setting, and the imaging setting of a specific imaging apparatus, which is an imaging apparatus that has captured the image data having the first element changed by the first operation, is changed so that the first element of the image data captured by the specific imaging apparatus has setting based on the second setting.

(22)

The imaging control method according to (20), in which the first operation is an operation related to an evaluation for the image data, and based on the imaging setting of an imaging apparatus that has captured the image data with the evaluation equal to or greater than a first threshold value, the imaging setting of the imaging apparatus other than the imaging apparatus that has captured the image data is performed.

(23)

The imaging control method according to (20), in which the first operation is an operation related to an evaluation for the image data, and in a case in which the number of pieces of the image data with the evaluation equal to or greater than a first threshold value is equal to or greater than a second threshold value, based on the imaging setting of an imaging apparatus that has captured pieces of the image data with the evaluation whose number is equal to or greater than the second threshold value, the imaging setting of the imaging apparatus other than the imaging apparatus that has captured the image data is performed.

(24)

The imaging control method according to (20), in which the first operation is an operation related to an evaluation for the image data, and the imaging setting of an imaging apparatus that has captured an image data group in which a total number of times the first operation is performed is equal to or less than a third threshold value is changed.

(25)

The imaging control method according to (20), in which any of the plurality of imaging apparatuses is caused to capture a plurality of pieces of the image data, with the imaging setting changed by a predetermined change width, and the imaging setting of the at least one imaging apparatus is changed based on the first operation with respect to the plurality of pieces of image data.

(26)

The imaging control method according to (20), in which an element of the image data displayed on the display is changed by a predetermined change width to display a plurality of pieces of the image data, and the imaging setting of the at least one imaging apparatus is changed based on the first operation with respect to the plurality of pieces of image data.

(27)

The imaging control method according to (25) or (26), in which the change width from a first width to a second width narrower than the first width is changed based on the first operation with respect to the plurality of pieces of image data.

(28)

The imaging control method according to (20), in which, in a case in which a preset subject is imaged by at least one of the plurality of imaging apparatuses, the imaging setting of an imaging apparatus that does not image the subject is changed to setting for imaging the subject.

(29)

The imaging control method according to (20), in which, in a case in which a preset subject is imaged by at least one of the plurality of imaging apparatuses, the imaging setting of the imaging apparatus that images the subject is changed.

(30)

The imaging control method according to (20), in which angles of view of the plurality of imaging apparatuses are changed from a first angle of view to a second angle of view narrower than the first angle of view based on the first operation.

(31)

The imaging control method according to (20), in which the first operation is an operation related to an evaluation for the image data, and a notification is given or the imaging setting of the at least one imaging apparatus is changed, in a case in which the first operation is not performed for a predetermined time.

(32)

The imaging control method according to (18) or (19), in which the first operation is an operation of causing a factor that affects a subject to be imaged by any of the plurality of imaging apparatuses.

(33)

The imaging control method according to (32), in which the factor that affects the subject is sound, heat, vibration, wind, or an electromagnetic wave.

(34)

The imaging control method according to (32), in which the first operation is an action of moving an object in an imaging region imaged by at least any of the plurality of imaging apparatuses or an action of moving the object from outside the imaging region into the imaging region.

(35)

An imaging control program for controlling a plurality of imaging apparatuses, the program causing a processor to execute: a step of changing, based on a first operation different from an operation of changing imaging setting of the imaging apparatus, the imaging setting for at least one imaging apparatus.

EXPLANATION OF REFERENCES

1*a*, 1*b*, 1*c*, 1: imaging apparatus
2: network
3: image storage server
4: image browsing device
40: control device
41: communication interface
42: memory
43: processor
44: display
51, 52, 53, 54: image data
51*a*, 51*b*, 51*c*, 51*d*, 51*e*, 51*f*, 51*g*, 51*h*: image data
FV: favorite icon
B1: plus icon
B2: minus icon
B: image adjustment icon
100: imaging system

What is claimed is:

1. An imaging control apparatus that controls a plurality of imaging apparatuses, the imaging control apparatus comprising:
a processor; and
a memory,
wherein the processor is configured to change, based on a first operation different from an operation of changing imaging setting of the plurality of imaging apparatuses, the imaging setting for at least one of the plurality of imaging apparatuses,
the first operation is an operation related to an evaluation for image data, and
the processor is configured to change the imaging setting of one of the plurality of imaging apparatuses that has captured an image data group in which a total number of times the first operation is performed is equal to or less than a third threshold value.

2. The imaging control apparatus according to claim 1,
wherein the processor is configured to perform, based on the imaging setting of one of the plurality of imaging apparatuses that has captured the image data with the evaluation equal to or greater than a first threshold value, the imaging setting of other of the plurality of imaging apparatuses than the imaging apparatus that has captured the image data with the evaluation equal to or greater than the first threshold value.

3. The imaging control apparatus according to claim 1,
wherein the processor is configured, in a case in which number of pieces of the image data with the evaluation equal to or greater than a first threshold value is equal to or greater than a second threshold value, to perform, based on the imaging setting of one of the plurality of imaging apparatuses that has captured pieces of the image data with the evaluation whose number is equal to or greater than the second threshold value, the imaging setting of other of the plurality of imaging apparatuses than the imaging apparatus that has captured the pieces of the image data with the evaluation whose number is equal to or greater than the second threshold value.

4. An imaging control method of controlling a plurality of imaging apparatuses, the imaging control method comprising:
changing, based on a first operation different from an operation of changing imaging setting of the plurality of imaging apparatuses, the imaging setting for at least one of the plurality of imaging apparatuses, wherein
the first operation is an operation related to an evaluation for image data, and
the imaging control method further comprises changing the imaging setting of one of the plurality of imaging apparatuses that has captured an image data group in which a total number of times the first operation is performed is equal to or less than a third threshold value.

5. A non-transitory computer readable medium storing an imaging control program for controlling a plurality of imaging apparatuses, the program causing a processor to execute:

changing, based on a first operation different from an operation of changing imaging setting of the plurality of imaging apparatuses, the imaging setting for at least one of the plurality of imaging apparatuses, wherein the first operation is an operation related to an evaluation for image data, and the program further causes the processor to execute changing the imaging setting of one of the plurality of imaging apparatuses that has captured an image data group in which a total number of times the first operation is performed is equal to or less than a third threshold value.

* * * * *